United States Patent [19]

Muka et al.

[11] Patent Number: 5,774,599

[45] Date of Patent: Jun. 30, 1998

[54] METHOD FOR PRECOMPENSATION OF DIGITAL IMAGES FOR ENHANCED PRESENTATION ON DIGITAL DISPLAYS WITH LIMITED CAPABILITIES

[75] Inventors: Edward Muka, Saint Louis, Mo.; Paul C. Ho, Madison, Wis.; Bruce Raymond Whiting, Plano, Tex.

[73] Assignees: Eastman Kodak Company, Rochester, N.Y.; Washington University, St. Louis, Mo.

[21] Appl. No.: 404,399

[22] Filed: Mar. 14, 1995

[51] Int. Cl.[6] .................................................. G06K 9/40

[52] U.S. Cl. ...................... 382/254; 382/263; 382/264; 378/98.2; 378/98.4

[58] Field of Search .................................... 382/254, 173, 382/191, 303, 264, 132, 128, 274, 130, 263; 358/447, 458; 250/587, 337, 363.01; 348/28; 378/98.2, 98.4

[56] References Cited

U.S. PATENT DOCUMENTS

| | | | |
|---|---|---|---|
| 4,315,318 | 2/1982 | Kato et al. | 364/515 |
| 4,317,179 | 2/1982 | Kato et al. | 364/515 |
| 4,346,409 | 8/1982 | Ishida et al. | 358/280 |
| 4,674,125 | 6/1987 | Carlson et al. | 382/303 |
| 4,697,594 | 10/1987 | Mayo, Jr. | 382/254 |
| 4,747,052 | 5/1988 | Hishinuma et al. | 364/414 |
| 4,903,205 | 2/1990 | Hishinuma | 364/413.13 |
| 5,319,719 | 6/1994 | Nakazawa et al. | 382/6 |
| 5,387,983 | 2/1995 | Sugiura et al. | 382/254 |

FOREIGN PATENT DOCUMENTS 2 194 706  3/1988  United Kingdom ............. H04N 1/46

OTHER PUBLICATIONS

Roehrig, H. et al., "Signal–to–Noise Ratio and Maximum Information Content of Images Displayed by a CRT", Proceedings SPIE Medical Imaging IV: Image Capture and Display (1990), vol. 1232, pp. 115–133.

E. Muka et al., "Display of Medical Images on CRT Soft–Copy Displays," SPIE Medical Imaging, vol. 2431, Image Display, 1995.

S. Daly, The Visible Differences Predictor; An Algorithm for the Assessment of Image Fidelity, A.B. Watson, Editor, Digital Images and Human Vision, Massachusetts: MIT Press, 1993, pp. 179–206.

J.H. Kim et al., "Improved Visualization of Simulated Nodules by Adaptive Enhancement of Digital Chest Radiography, " Acad. Radio., vol. 1, No. 2, Oct. 1994, pp. 93–99.

Pratt, William K, Digital Image Processing , 2nd Ed., John Wiley & Sons, Inc., New York, 1991, pp. 303–305.

R. Bollen and J. Vranckx, "Influence of Ambient Light on the 'Visual' Sensitometric Properties of, and Detail Perception on, a Radiograph", Proc. SPIE, vol. 273, Application of Optical Instrumentation in Medicine IX, pp. 57–61.

S. Raganath, "Image Filtering Using Multiresolution Representations," IEEE Transactions of Pattern Analysis and Machine Intelligence, vol. 13, No. 5, May 1991, pp. 426–440.

Prokop et al. "Improved Parameters for Unsharp Mask Filtering of Digital Chest Radiographs," Radiographs 1993, 187:521–526.

*Primary Examiner*—Jose L. Couso
*Assistant Examiner*—Anh Hong Do
*Attorney, Agent, or Firm*—William F. Noval

[57] ABSTRACT

A method of processing a digital image (medical, radiograph) in order to enhance viewing of the image when it is presented for display on a display device (video monitor). An original medical image is digitized and precompensation applied to the digital values to optimize the information content and detail at a CRT, for example. The luminance dynamic range and the spatial frequency content of the original image are reduced to present the most usable image on a display device. The characteristics of the human visual system and the ambient light incident on a calibrated display are factors in the final precompensation of the image.

26 Claims, 8 Drawing Sheets

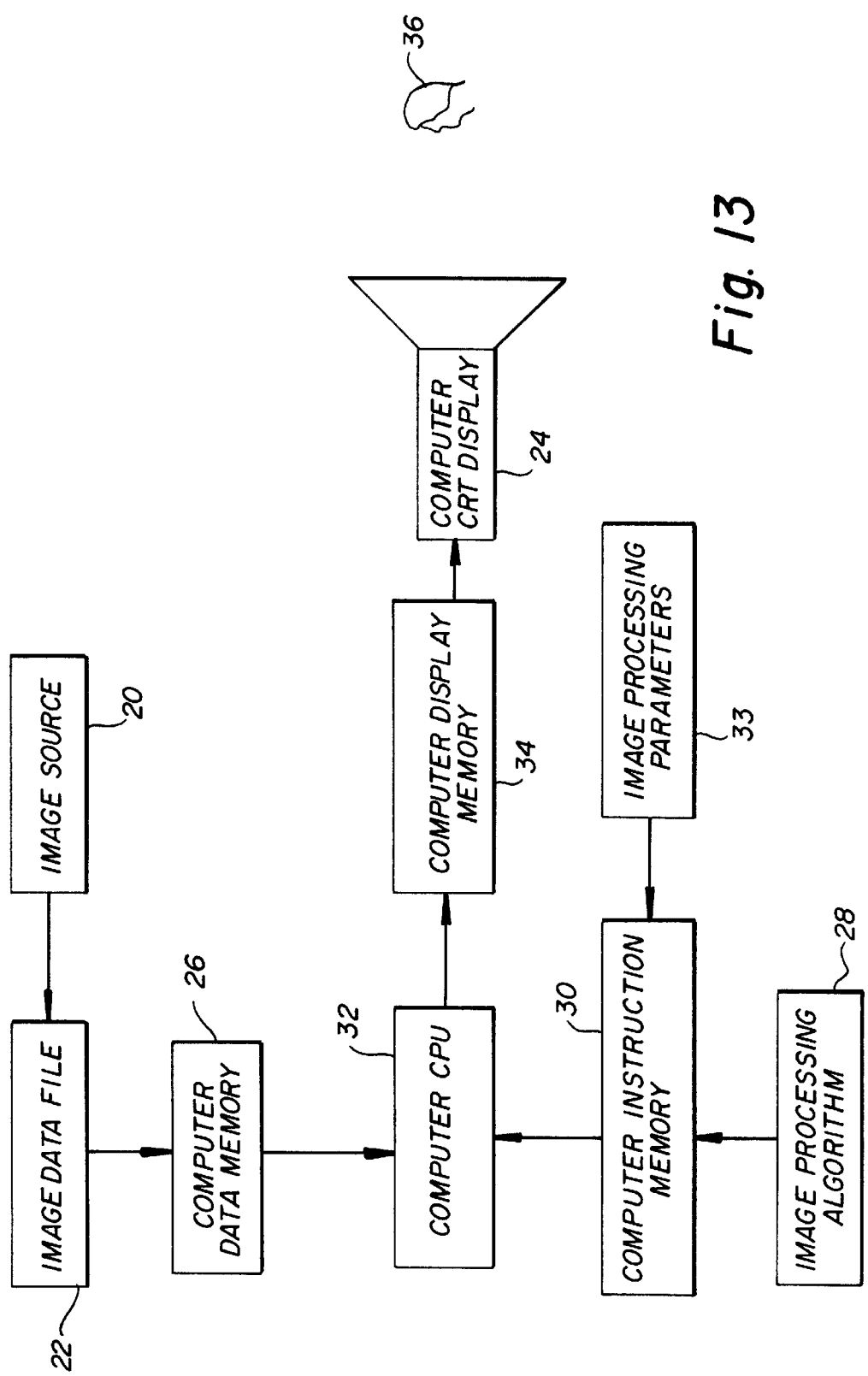

METHOD FOR PRECOMPENSATION OF DIGITAL IMAGES FOR ENHANCED PRESENTATION ON DIGITAL DISPLAYS WITH LIMITED CAPABILITIES

FIELD OF THE INVENTION

The present invention relates generally to image enhancement processing and relates more specifically to precompensation image processing for the enhancement of digital (radiographic) images which are displayed on devices with limited display capabilities.

BACKGROUND OF THE INVENTION

Film on an illuminated light box has been the standard for the display of medical imagery for diagnostic purposes. While film's image quality is superb, in other respects it is considered undesirable because it is bulky, difficult to keep track of, awkward to transport, difficult to store, not easily replicated, and overall operations are costly. Thus, there is a trend toward the use of digital imagery and digital displays instead of film. Digital imagery can be electronically transmitted and stored, a major improvement over film. However, current digital displays are a limiting factor in the quality of a digitally presented image. (Soft-copy displays, e.g., CRT's, are currently the most commonly used in the electronic radiology systems and will be the focus of this discussion. However, digital prints onto reflective hardcopy also suffer limitations similar to those described for CRT's, and will benefit from the improvements provided by the present invention.)

Typically, digital displays have lower spatial resolution, smaller maximum luminance and less luminance dynamic range compared to film transilluminated on a light box, presenting inferior image quality, particularly when operating in hospital areas that contain high levels of ambient light. It has been generally accepted that the only way to overcome the limitations of soft-copy display would be to increase spatial resolution and overall luminance. While these goals will make soft-copy displays more usable, they will likely increase their cost. It is therefore desirable to provide image processing to precompensate digital medical images for improved diagnostic utility on ordinary, inexpensive displays, even in the presence of high ambient light.

It is further desirable to enable presentation of a projection radiographic chest image on a CRT in an intensive care unit, ICU. Clinicians can get immediate feedback on tube placement, absence of pneumothorax, and other findings without waiting for an image to be printed in the main radiology department and transported to the ICU. There are economic constraints on the costs of the display units which can be placed throughout the hospital, limiting the performance of affordable displays in terms of spatial resolution, brightness and dynamic range. Furthermore, ICUs typically are very brightly lit and the high level of ambient light incident on the display cuts down on the display's ability to represent an image with fidelity.

To describe the problems solved by the present invention, a review of the characteristics of medical imagery and human observers will be given, as well as a detailed description of the attributes of both film and digital displays.

A film image of projection radiography of the chest typically generates a image with a sensitometric luminance dynamic range of approximately 2.5 to 3.5 $\log_{10}$ units. The luminance dynamic range of the film image, DRimage, is therefore 2.5 to 3.5 $\log_{10}$ units. A film image when transilluminated on a light box for viewing typically produces a maximum luminance of over 2400 candela/m$^2$ (nits) and a minimum luminance of 0.8 nits, when measured in a dark viewing room. In terms of spatial resolution, a laser printer typically has a pixel size of 80 microns, with over 4000 pixels per line.

CRTs provide less available luminance dynamic range than film on a light box. A typical CRT in a darkened room has a maximum luminance of 160 nits and a minimum of 0.5 nits. CRTs typically produce a luminance dynamic range, DRdisplay, of about 320 or 2.5 $\log_{10}$ units. Additionally, CRTs have a limited spatial resolution due to high-spatial-frequency attenuation which reduces fine detail contrast. CRTs attenuate the highest spatial-frequencies due to limitations in amplifier switching time and light piping in the glass face plate (See: Roehrig, H; Ji, TL; Browne, M; Dallas, WJ; Blume, Hartwig. "Signal-to-Noise Ratio and Maximum Information Content of Images Displayed by a CRT". Proceedings SPIE Medical Imaging IV 1990. 1232:115–133). Current CRT displays have 1000 to 2000 pixels per image line, with pixel sizes approximately 250 microns.

Furthermore, CRTs manifest a nonlinear luminance response to an amplitude signal or driving level (See: E. Muka, H. Blume, S. Daly, "Display of Medical Images on CRT Soft-Copy Displays", SPIE Medical Imaging 1995, Vol. 2431, Image Display, 1995), which must be corrected to allow control of the appearance of a displayed image. To compensate for this nonlinear response, image input data are passed through a look-up-table (LUT) prior to display so that nonlinearity of the display is minimized and the image is correctly rendered on the display as a function of luminance. Each monitor can be individually characterized and a unique LUT provided to produce a known luminance response. This step enables the display of images on CRTs so that the images appear nominally the same on the CRT as they would appear on a transilluminated film image.

Unfortunately, the above stated luminance dynamic range values are limited to viewing areas wherein the ambient light is well controlled, such as in a darkened radiology reading room. Typical hospital working conditions provide high ambient light that creates a "glare luminance" that appears to emanate from the CRT. Ambient light in the ICU for instance typically creates a "glare luminance" which increases the minimum luminance to about 3.2 nits, thus reducing the luminance dynamic range of the CRT to about 50 or the $\log_{10}$ dynamic range to 1.7. Ambient lighting can also vary substantially between locations.

In combination the above factors degrade the perceived appearance of a displayed image on a CRT versus film and the digital image "looks different", compromising interpretation by experienced radiologists. The role of each factor can be understood from a knowledge of the human visual system (HVS). HVS performance is characterized by a contrast sensitivity function that depends on parameters such as absolute luminance, spatial frequency, image detail, noise and other factors (See S. Daly, The Visible Differences Predictor; An Algorithm for the Assessment of Image Fidelity, in A. B. Watson, Editor, Digital Images and Human Vision, pp 179–206, Massachusetts: MIT Press, 1993). Because there is reduced maximum luminance available at the CRT when compared to the maximum luminance available at a light box, a human observer is less proficient at detecting detail and contrast. Likewise, the decreased luminance dynamic range and lowered spatial resolution of the digital reduces a viewer's ability to extract useful information when compared to film.

The task of a display device is to present all diagnostic image information, i.e., that currently utilized in film readings, for viewing by the human observer. This presents a problem, since this information exceeds the capacity of digital display devices (e.g., dynamic range of CRTs is only 1.7 $\log_{10}$ units while film range is 3.2 $\log_{10}$ units). Typically image processing techniques attenuate the amplitude values in a digital image enabling it to fit into the smaller luminance dynamic range which is available on a CRT. However, simple attenuation produces a loss in image contrast and visibility of details such as edges and textures. Detailed features may already be difficult to see in an original image, thus, additional loss of detail due to luminance factors may render an image unsuitable for viewing on a CRT. Obviously, more powerful image processing approaches must be considered if one hopes to successfully display medical images on CRTs in high ambient light and achieve the level of detail discrimination achieved with film.

U.S. Pat. No. 5,319,719, issued Jun. 7, 1994, by Nakazawa et al., discloses an apparatus for processing digital radiographic images by decreasing the amplitude of a low frequency component of an original signal through unsharp masking to compress the luminance dynamic range of a displayed image. There is no disclosure of boosting high frequencies of the digital radiograph image or of correlating ambient viewing conditions or the HVS with the image compensation treatment.

U.S. Pat. No. 4,903,205, issued Feb. 20, 1990, by Hishinuma, discloses a radiation image displaying system in which an original digital radiographic image is processed for display. An unsharp mask signal corresponding to a super-low frequency filter is obtained and a processed signal is derived from the sum of the original signal and the difference between the original signal and the unsharp mask signal multiplied by an emphasis coefficient. There is no disclosure of emphasizing the high frequency range to compensate for high frequency attenuation of the display device.

U.S. Pat. No. 4,747,052, issued May 24, 1988, by Hishinuma et al., discloses a radiation image processing technique in which an image processed signal S is obtained from the operation as follows: S=SORG+b (SORG−SUS) where S is the image processed signal; SORG is the original digital signal; b is a frequency emphasizing coefficient; and SUS is the unsharp mask signal. The median of a group of digital signals in an unsharp mask of a predetermined size is employed. (See also; U.S. Pat. No. 4,315,318, issued Feb. 9, 1982, inventors Kato et al.; U.S. Pat. No. 4,317,179, issued Feb. 23, 1982, inventors Kato et al.; U.S. Pat. No. 4,346,409, issued Aug. 24, 1982, inventors Ishida et al.)

Most of the prior art described above concerns film output for displaying the results. The article "Improved Visualization of Simulated Nodules by Adaptive Enhancement of Digital Chest Radiography", by J. H. Kim et al.; Acad Radio, Vol. 1, No. 2, Oct. 1994, pages 93–99, discloses an adaptive-enhancement algorithm for displaying chest radiography on a CRT monitor which compresses dynamic range and enhances image contrast selectively in a specific anatomical region. This article makes no mention of CRT luminance calibration nor is there any discussion of the correlation of or the performance of the HVS to the viewing conditions in which the display is placed.

There are thus problems in typical image processing solutions for soft copy display of medical imaging.

SUMMARY OF THE INVENTION

The present invention provides a solution to the problems of the previous soft copy display methods. The present invention provides a process that precompensates medical images for the loss of image quality in digital displays due to their characteristics of less maximum luminance, less luminance dynamic range and less high-frequency response, and the deleterious effects of operating the display in a high ambient light environment. It recognizes the fact that a human observer is involved and bases the selection of critical parameters of the process on an understanding of the human visual system.

In general, the present invention provides a method of precompensating digital (e.g., radiological) images for display on commercially available display devices (e.g., CRTs) to facilitate access by observers (e.g., clinicians) in high ambient light (e.g., Intensive Care Unit) environments. Advantages of the method of the invention are that it is a simple, computationally efficient process, and visually lossless, that is, the method produces an image on a CRT that contains as much perceptible detail as transilluminated radiological film. Preliminary observations of the technique in simulated ICU high ambient lighting indicate that soft-copy display using the disclosed precompensation process produces a CRT image that is qualitatively equivalent to film for visualizing details of pneumothoraces, assessing line placement and other detailed findings. In some cases, for example, as for over-penetrated films, soft-copy display using the disclosed precompensation is superior to film.

According to one feature of the present invention, a method is provided for enhancing the visibility of a CRT image in a medical imaging computer system comprising the steps of providing digital image data which is representative of an original medical image and having a luminance dynamic range and a spatial frequency content representative of the original medical image; determining a low frequency component signal of the digital image; determining a high frequency component signal of the digital image; producing an attenuated low frequency component signal of the digital image from the low frequency component signal; producing an amplified high frequency component signal of the digital image signal from the high frequency component signal; and combining the attenuated low frequency component signal and the amplified high frequency signal to produce a precompensated image signal which has improved luminance dynamic range and spatial frequency characteristics when the image is presented for display on the display device.

BRIEF DESCRIPTION OF THE DRAWINGS

FIG. 13 is a block diagram of apparatus for implementing the method of the present invention.

DETAILED DESCRIPTION OF A PREFERRED EMBODIMENT

Figure 1:
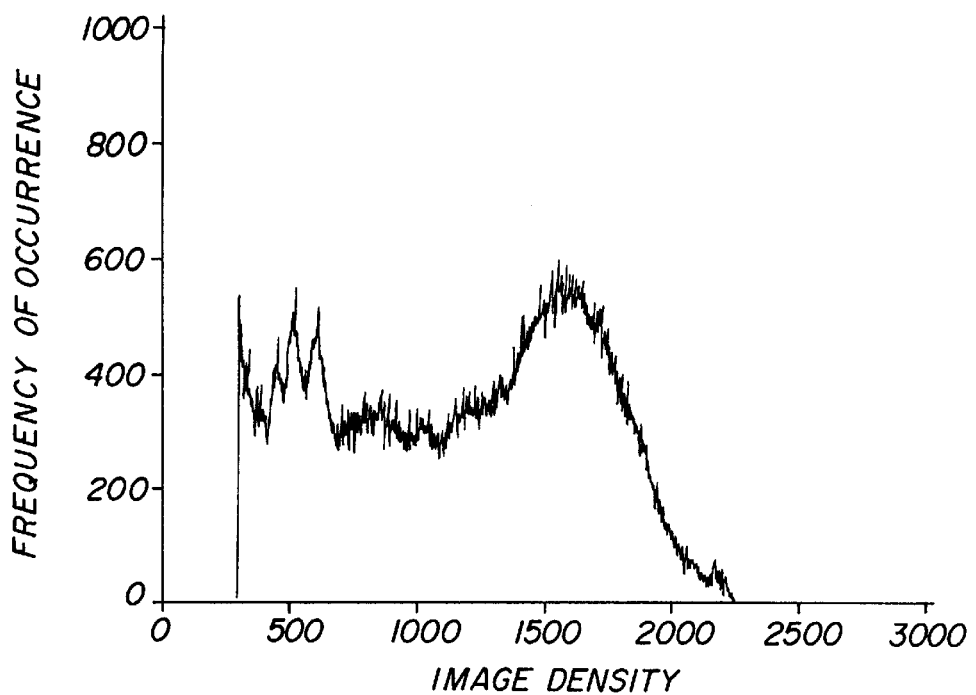
FIGS. 1–6 are graphical views useful in explaining the present invention.

Although the following description of the image processing method of the present invention describes processing of digital radiographic images, it will be understood that the invention is applicable to other types of medical images, and also to any digital image which can be visually presented on a display device.

Referring now to FIG. 13, there will be described illustrative apparatus in which the present invention is incorporated. It will be understood by those skilled in the art, that the invention may be incorporated in an apparatus other than that described while staying within the scope of the present invention. As shown, an image source 20 produces a digital image which is stored in image data file 22. Image source 20 can, for example, be a source of a medical or radiographic image (e.g., x-ray source, diagnostic imaging source (CT, MRI, US, PET), storage phosphor reader, x-ray film digitizer, image archival source (magnetic or optical disk, etc.). The image data file representing an image to be processed before display on computer display 24 (cathode-ray-tube (CRT), liquid crystal display, plasma display, reflective hardcopy printer, etc.) is stored in computer data memory 26. The image processing method, according to the present invention, can be stored in memory 28 (ROM, hard drive), a copy of which is then stored in the computer instruction memory 30. Image processing parameters are entered into memory 30 by way of image processing parameters device 32 (user input device, other computer, etc.).

The computer central processing unit, CPU, 32 (e.g., a microprocessor) processes the image stored in memory 26 in accordance with the image processing algorithm stored in memory 30. The processed image is stored in computer display memory 34 prior to presentation for display on display 24 where it can be observed by human observer 36.

In the following description of the present invention, reference will be made to the processing of chest radiographs. It is intended to process the chest radiographs in such a way as to render the image clinically useful on a modestly priced, commercially available display (1k×1k pixel matrix, luminance maximum of 160 nits) while minimally changing the overall appearance of the image relative to film and minimizing artifacts.

The images used in an initial study comprise a set of pneumothorax films acquired on medium speed, wide latitude screen film. (In an extension to the study a set of images from other imaging situations was included). The image set was a series of PA (posterior-anterior) and lateral radiographs taken on 35×47 cm film. A subset of twenty PA films which are characteristic of these radiographs was selected. Images included very subtle pneumothoraces, more obvious tension pneumothoraces, interstitial lung disease as well as a selection of central catheters, pacemakers and chest tubes.

Image Processing Approach

The majority of the dynamic range of a radiological image is carried by low spatial-frequency components. The HVS, however, is relatively insensitive to these low spatial-frequencies. Low-frequency components of the image convey information such as image type, gross location within the image and tissue type (for example PA chest vs. lateral chest vs. hand, mediastinum vs. lung fields, soft tissue vs. bone, and subdiaphragmatic lung vs. superdiaphragmatic lung). For this reason, the dynamic range of this component can be reduced without compromising useful image information.

High-frequency content carries detail, texture and edge information that is most critical for diagnosis. The HVS is more sensitive to these higher frequencies. By preserving or enhancing the high frequency content of an image while reducing the low frequency components, a more useful image can be presented on a digital display. This effect can be seen by the analysis of image characteristics, as shown in FIGS. 1–6.

FIG. 1 is a histogram of center 640,000 (800×800 pixel region) pixels of an unprocessed chest radiograph. This image has all of its original frequency components. The width of the curve indicates the difference between the lightest (least dense) and darkest (most dense) points. The width of the curve is proportional to the magnitude of the luminance dynamic range. Density=$\log_{10}$ (luminance).

Figure 2:
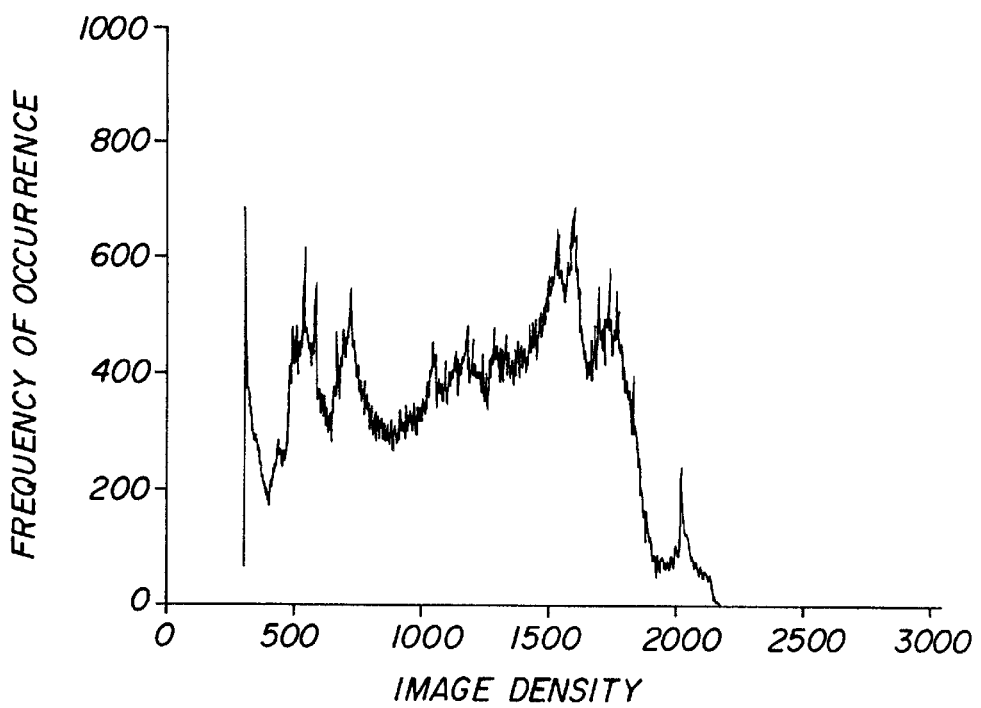

FIG. 2 shows a histogram of center 640,000 pixels of a chest radiograph in FIG. 1, after the image pixel values have been processed or blurred using an unsharp mask size of 59 pixels square. The unsharp image mask contains only the low-frequency (less than 0.13 cycles/mm) components. Note that the width of the curve representing the luminance dynamic range in FIG. 2 comprising only the low frequency component is nearly the same width as the luminance dynamic range curve in FIG. 1. This indicates that the low-frequency component of an image carries most of the dynamic range of the whole image.

Figure 3:
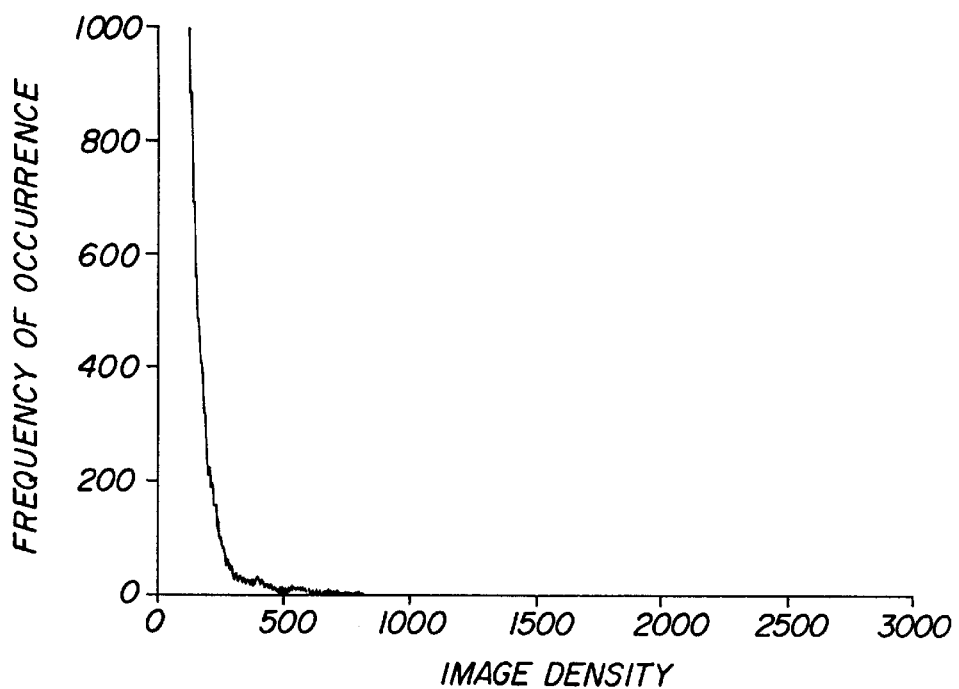

FIG. 3 shows a histogram of center 640,000 pixels of the radiograph in FIG. 2, subtracted from radiograph in FIG. 1. This image contains only the high-frequency (greater than 0.13 cycles/mm) components. Note that the width of the curve is much less that the widths of the previous curves. This indicates very little dynamic range is carried by the high-frequency component, thus a relatively small portion of the original dynamic range is required to display the high-frequency component by itself.

Figure 4:
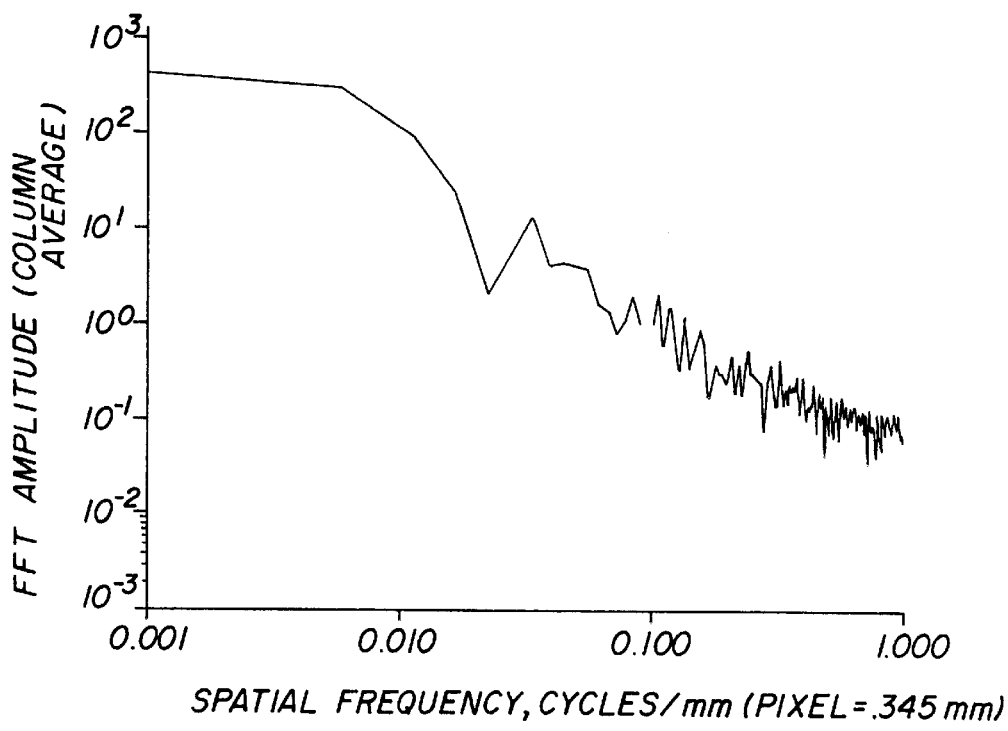

FIG. 4 represents a Fast Fourier Transform (FFT) of the same image. The center 512×512 pixel region of the chest radiograph in FIG. 1 was averaged in the vertical direction producing a 512 pixel average scan line. The average scan line was passed through a Fourier transform and the magnitude displayed. Note that the low frequency components manifest a greater amplitude than the high frequency components.

Figure 5:
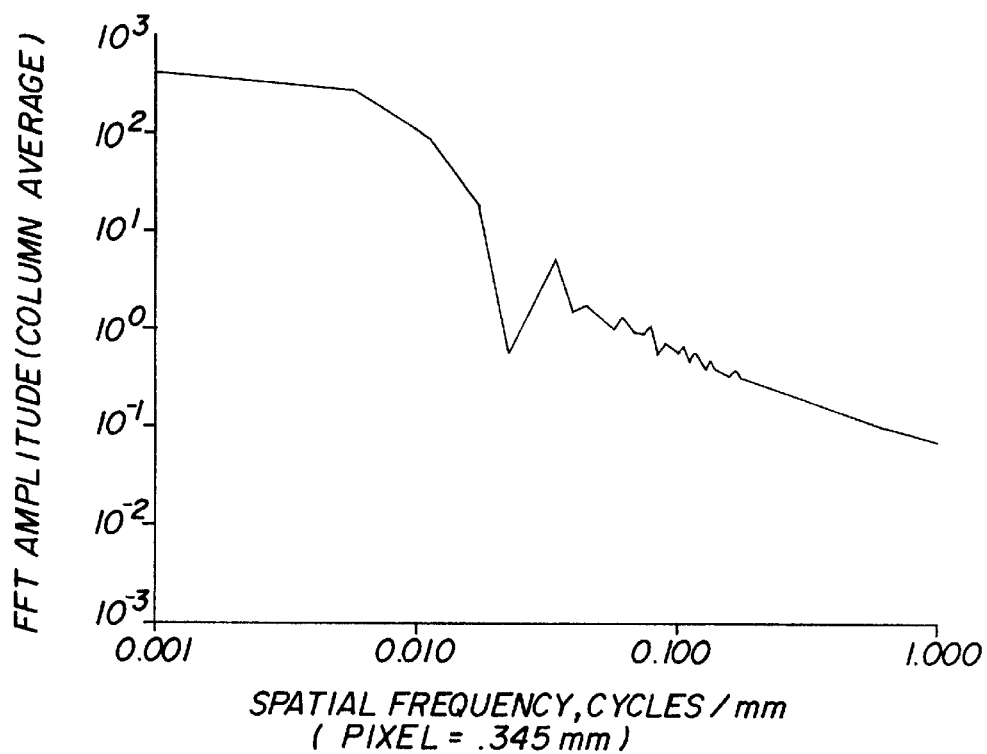

FIG. 5 shows the FFT of the center 512×512 pixel region of the chest radiograph in FIG. 2. Note the reduced high-frequency component of the low-pass filtered image.

Figure 6:
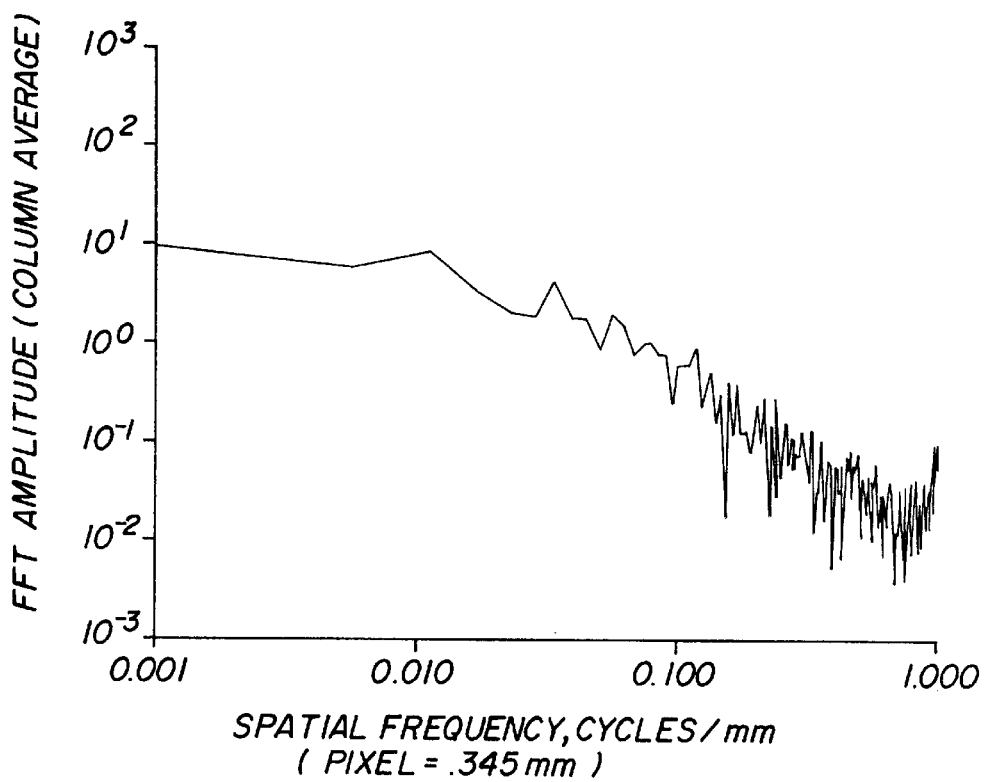

FIG. 6 shows an FFT of the center 512×512 pixel region of the chest radiograph in FIG. 3. Note the reduced low-frequency component of the high pass filtered image.

One problem with this type of image processing is that high-frequency amplification can also enhance granularity noise. Noise granularity generally appears at frequencies higher than the frequencies of the detail information used for diagnosis. The present invention makes use of the effect that the high-frequency attenuation of the monitors attenuates this noise without using a more complicated process. If a display device without high-frequency attenuation were used, different parameters for filtering and a final low-pass filter would be needed.

Preferred Image Processing Method

Figure 7:
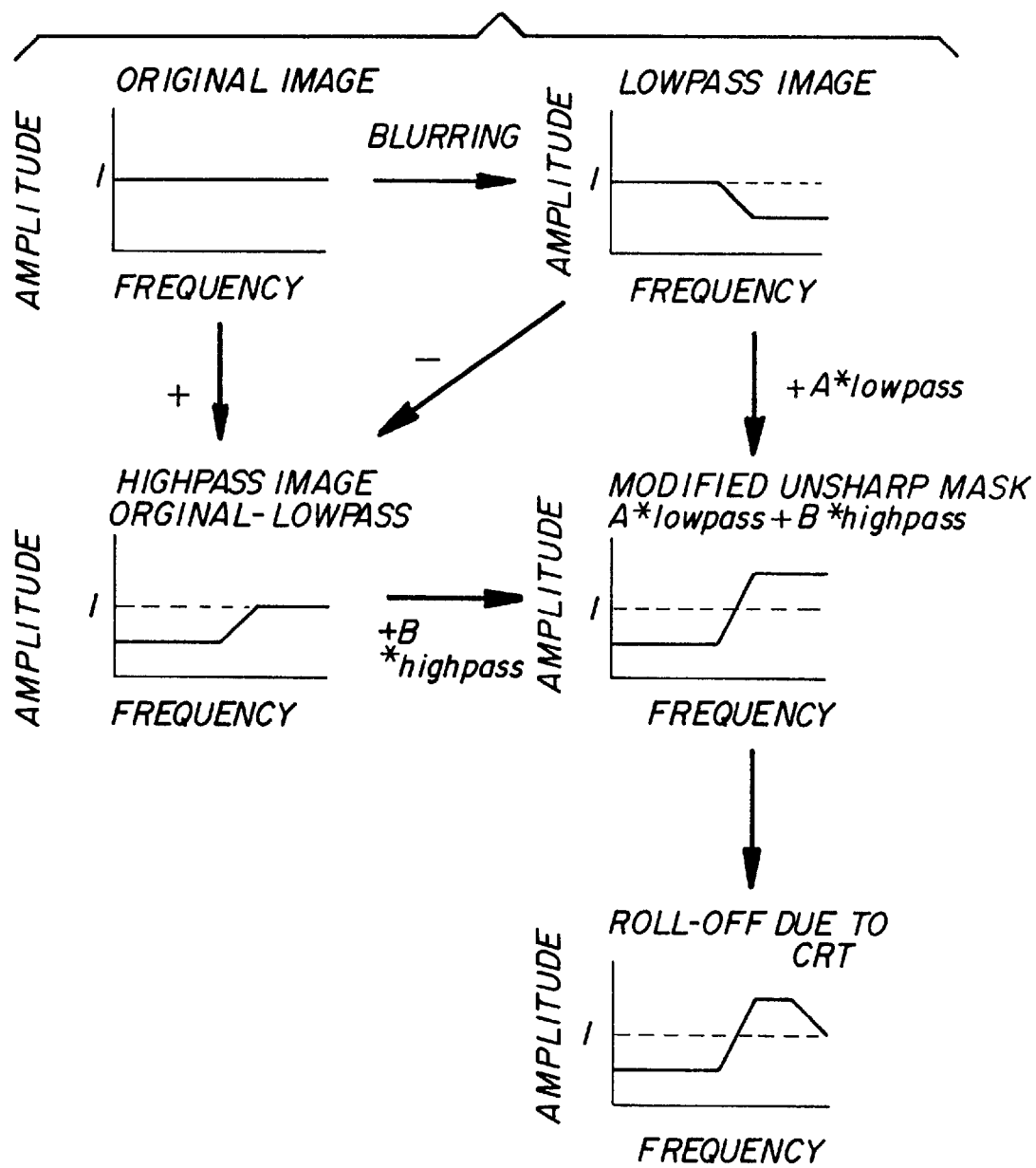
FIG. 7 is a diagrammatic view of an embodiment of the image processing method of the present invention.

In general, according to a preferred embodiment of the image processing method of the present invention shown in FIG. 7, the image is separated into low spatial-frequency and high spatial-frequency components. The low-frequency component is attenuated and the high-frequency component is amplified. Attenuation of the low-frequency component reduces the dynamic range of the whole image without a substantial loss of detail in the image. The observer sees a change in low-frequency contrast but is still able to identify image type and location of regions within the image. Preamplification of the high-frequency component, pre-emphasizes the image to compensate for the high-frequency attenuation caused by the CRT and ambient lighting. Additionally, high-frequency amplification helps enhance edges present in the image. This is illustrated in FIGS. 8 and 9.

Figure 8:
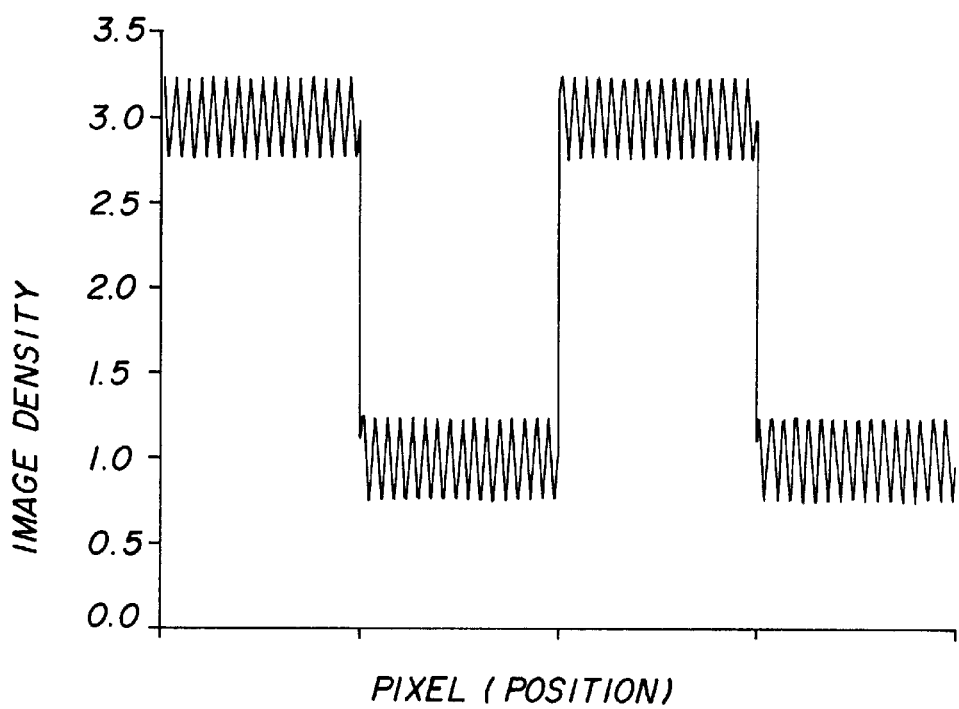
FIGS. 8 and 9 are stylized graphical views of a radiograph.

FIG. 8 shows a stylized representation of a region of a radiograph. There is a low amplitude, high-frequency sine wave superimposed on a high amplitude, low-frequency square wave.

Figure 9:
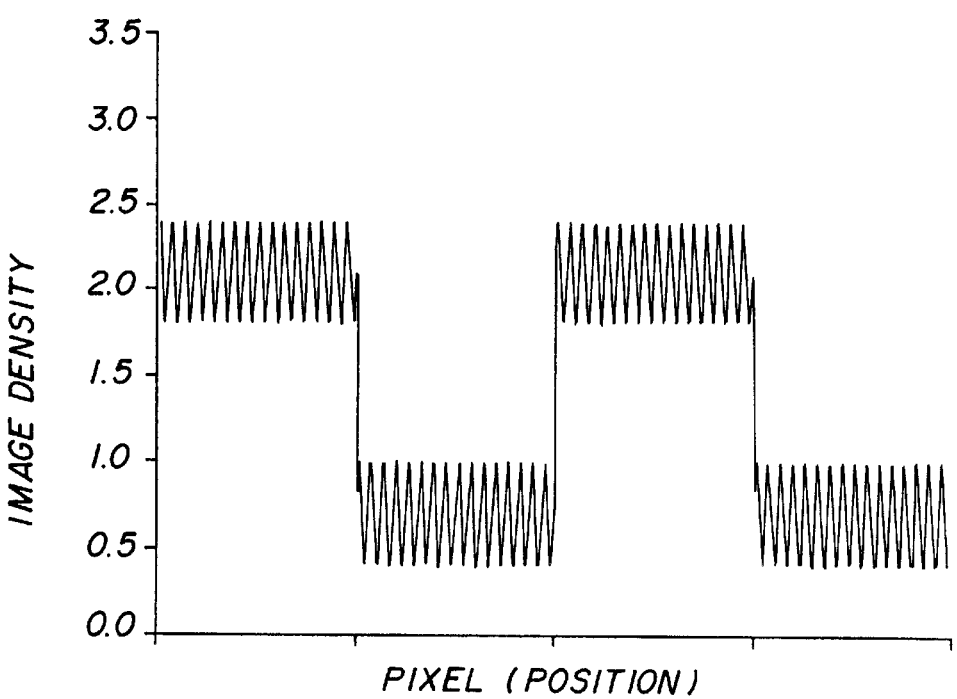

FIG. 9 shows a filtered version of FIG. 8 after processing according to the invention. Note that the amplitude of the high-frequency sine wave is increased and amplitude of the low-frequency square wave is reduced. The overall amplitude is reduced and the dynamic range is decreased, allowing such an image to fit into a more limited dynamic range display, with the high frequency boost compensating for the display's contrast attenuation.

One computationally efficient way of separating the image into frequency components is the unsharp mask (USM) filter algorithm. (See: Pratt, William K. Digital Image Processing 2nd Ed. John Wiley & Sons, Inc. New York. 1991. pp. 303–305.) The USM method uses a uniformly weighted spatial average of a square mask of pixels (kernel) to create a blurred or low-pass frequency version of the image. The blurred version of the image is subtracted from the original image so that only the high-frequency portion or high-pass portion of the image remains. The two components are scaled appropriately and summed, producing a reduced dynamic range, sharpness enhanced version of the image. The computation can be further simplified as follows:

highpass image = original image − lowpass image output = lowboost * lowpass image + highboost * highpass image
= lowboost * lowpass image + highboost * (original image − lowpass image)
= (lowboost − highboost) * lowpass image + highboost * original image Parameters for optimizing the image include: lowboost, highboost, and mask size for the frequency separation.

The enhancement method of the present invention, unlike the typical unsharp mask, independently scales both the low-pass and high-pass portions of the image. In the typical unsharp mask, the high-pass portion of the image is boosted and the low-pass portion of the image is left unmodified. Thus, the typical unsharp mask produces edge enhancement without reducing dynamic range.

Figure 10:
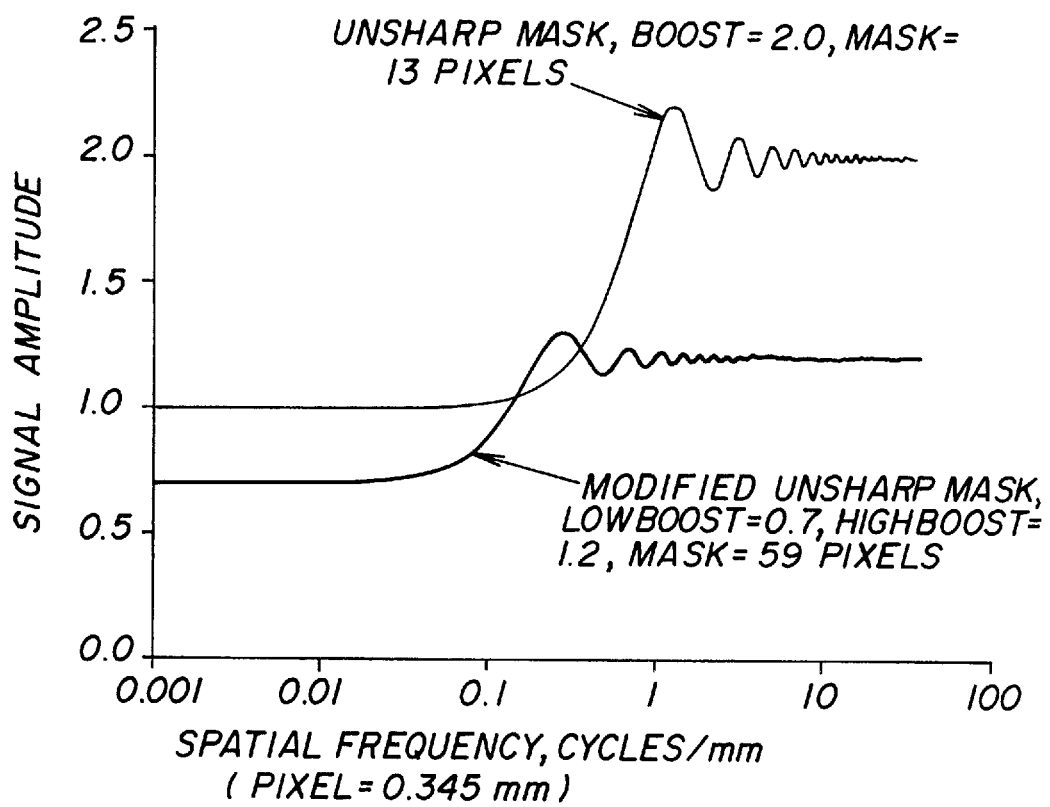
FIG. 10 is a graphical representation of the difference between of the transfer function of the standard and modified unsharp mask algorithm.

FIG. 10 shows transfer functions (0.345 mm pixels) for the typical unsharp mask filter with a mask 13 pixels square having a high-frequency boost of 2.0 and a modified unsharp mask filter with a mask 59 pixels square, having a lowboost of 0.7 and a highboost of 1.2. Note that the modified unsharp mask attenuates the low frequencies, enhances starting from a lower frequency and provides less high-frequency gain than the typical unsharp mask.

Figure 11:
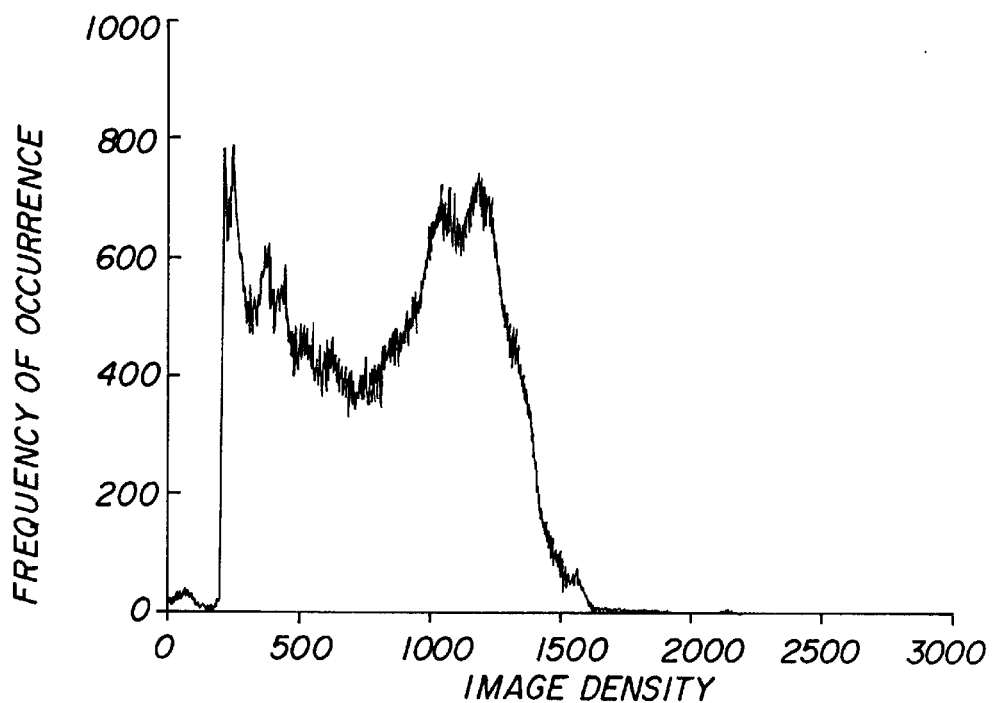
FIGS. 11–12 are graphical views useful in explaining the present invention.

FIG. 11 shows the results of applying the modified algorithm wherein a histogram of the center 640000 pixels of the radiogram in FIG. 1 as shown after processing with the modified algorithm shown in FIG. 10. Note that the image dynamic range is reduced.

Figure 12:
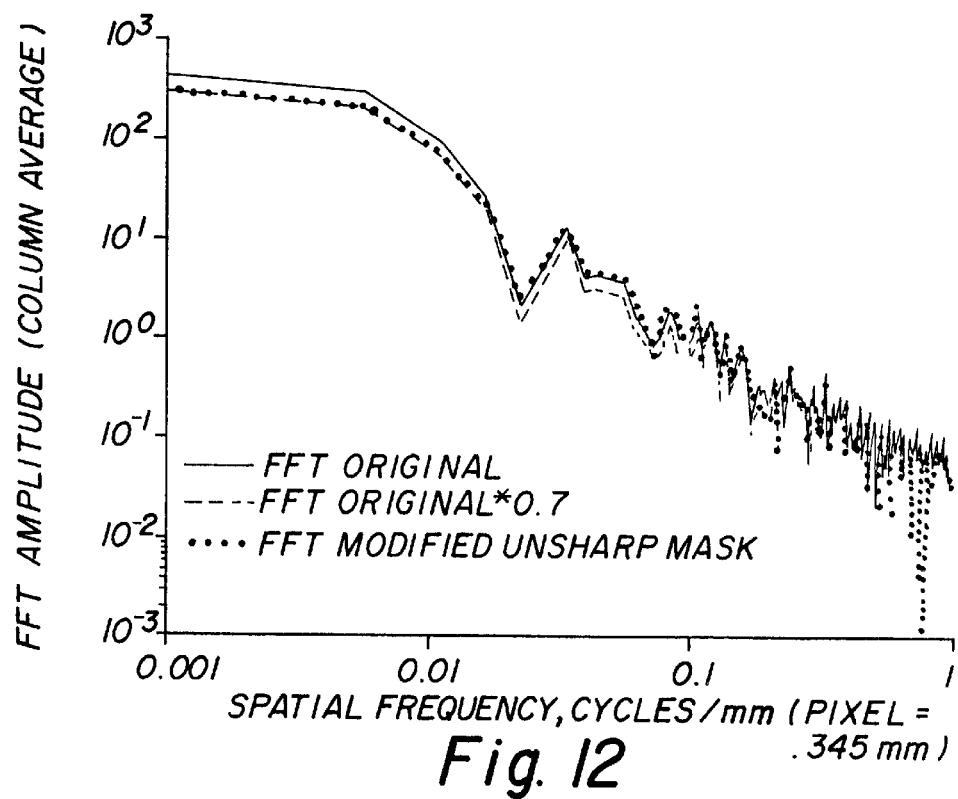

FIG. 12 shows the results of applying the modified algorithm to the radiogram in FIG. 1 wherein the center 512×512 region is depicted as an FFT. Compare the original image shown as a solid line with that image processed with the modified unsharp mask algorithm shown as the short, wide dashed line. The long, thin dashed line is the original image scaled by lowboost (0.7).

Selection of Parameters

Lowboost

The image processing method of the present invention is based on the luminance dynamic range of the image, DRimage. The method accounts for the fact that the image is displayed on a CRT having a luminance dynamic range less than DRimage. Thus the processed display image, DRdisplay has a smaller dynamic range than the original image, DRimage. As a starting point, the image processing sets the lowboost parameter to DRdisplay/DRimage.

In a preferred embodiment, the value of lowboost is set by the dynamic range requirements of the application. As stated earlier, in a typical ICU the available CRT luminance dynamic range is 1.70 log units. Due to typically high ambient light incident on an ICU CRT, the viewable luminance dynamic range of an original transilluminated film image is typically reduced from the sensitometric value of 3.5 $\log_{10}$ units to about 2.50 $\log_{10}$ units (See: R. Bollen and J. Vranckx, Influence of ambient light on the visual sensitometric properties of, and detail perception on, a radiograph, Proc. SPIE Vol. 273 Application of Optical Instrumentation in Medicine IX, pp. 57–61, 1981). The ratio of these two dynamic ranges (1.7/2.5) is 0.7. This ratio puts an upper limit on the value of lowboost. In the initial experiments, the value of lowboost was set to 0.7.

Highboost

However, attenuating the image contrast by lowboost is unacceptable as stated earlier. Therefore, the attenuation caused by lowboost is restored in the higher spatial frequency details of the image. Very little of the luminance dynamic range of an image is used by the high-frequency components, as shown in FIG. 3. Thus, as a starting point, the image processing sets highboost=1/lowboost.

Additionally, the CRT often causes a loss in image contrast due to a loss in contrast transfer at increasing spatial frequencies, thus this property demands additional compensation (enhancement) of the image to be displayed. Highboost is increased to account for this aspect.

The final value of highboost is determined by the amount of edge and sharpness enhancement desired by the observer. The user may select the amount of sharpness needed for the current task. Detail oriented tasks require the inclusion of more detail and thus more highboost of displayed images.

Mask Size

The spatial frequencies that are enhanced are based on the HVS model and typical soft-copy display characteristics as follows: HVS provides a maximum contrast sensitivity function, CSF, at about 4 cycles/degree, although this frequency is a function of the absolute luminance. In typical viewing conditions for displays of medical images, viewers are positioned at about 50 cm from the display. This implies a maximum CSF at a spatial frequency of about 0.5 cycles/mm at the display. As a minimum, the image should be enhanced at this spatial frequency so that the HVS can perform effectively. Images should be enhanced in some useful range about that spatial frequency.

Many useful features in medical images occur at characteristic lengths of about 2 cm or shorter, which implies a spatial frequency of about 0.05 cyc/mm. Thus, image enhancement preferably begins at about 0.05 cycles/mm and extends past 0.5 cycles/mm. USM operates in this manner as it is a high-pass filter. Selecting an USM mask of 2 cm enables restoration of the attenuation imposed on the image by compression of the luminance dynamic range (Lowboost process) so that the HVS can effectively view an image on a CRT. Based on calculations used to construct FIG. 10, it can be shown that USM provides fully developed enhancement for all spatial frequencies beyond a 1.4/Mask Size. Thus, a 2 cm mask size provides fully developed enhancement after 0.07 cycles/mm which meets the above requirements.

For typical CRT with a picture height of about 25 cm and a pixel addressability of about 1000 pixels, a pixel frequency of 4 pixels/mm results. Since a typical chest x-ray film is larger than the CRT viewing area, the image having dimensions of 43 cm high, the image is reduced and appears smaller when displayed on the CRT. Thus, a 2 cm feature in the image will be rendered as a 1.2 cm feature on the CRT. This requires about 49 CRT pixels (mask size should always be odd) to compose the mask of the modified USM method of the present invention. This places the maximum gain of the modified USM method at about 0.11 cycles/mm, which meets the requirements discussed in the previous paragraph. As this display size is somewhat smaller than the real image, CRT displays for medical images usually include a feature that permits the image to be magnified. Magnification enables an operator to increase the size of CRT image features so that the features appear the same size on a CRT as they would appear on film. This optional magnification reduces the spatial frequency at which the modified USM enhancement occurs to the values quoted above.

Typically, image enhancement processing such as USM increases the visibility of high spatial frequency noise. Complex image processing such as multiresolution representations based on octaves of spatial frequency are employed to limit the enhancement at higher spatial frequencies and decrease the visibility of high spatial frequency noise (See S. Ranganath, Image Filtering Using Multiresolution Representations, IEEE Transactions of Pattern Analysis and Machine Intelligence, Vol. 13, No. 5, pp 426–440, May, 1991). Because the CRT causes a loss in image contrast at increasing spatial frequencies, the CRT effectively provides a low-pass filter of the displayed image. As a result of this effect, the invention can use a modified USM successfully resulting in a very simple technique.

However, it is certainly possible to implement the enhancement effect of the modified algorithm using the multiresolution representation approach because the method is very general. In fact, a conventional USM filter can be used to implement Highboost with a LUT to implement Lowboost providing a completely equivalent method to the modified USM method.

Calibrated Display Requirement The present invention provides a luminance-calibrated soft-copy display so that image data can be correctly displayed with respect to luminance. Many existing image processing processes do not include this aspect. It is a significant factor to producing visible image details because of the non-linear behavior of the HVS. This aspect of the operation is also significant as the images preferably appear familiar (like transilluminated film) to radiologists who typically have been trained viewing images visualized using traditional film and light box methods. The CRT is calibrated using a LUT to accept input data as film density which represents the space in which the enhancement was completed.

Test Results for Sample Images

For the initial study, various levels of highboost and mask size were tried on a typical CRT display under typical ICU lighting conditions. This situation provided a working example of all of the salient factors that were discussed previously.

Chest images used in the study were all characterized by a log DRimage=2.5. The display was operated in ambient lighting which limited the luminance dynamic range to log DRdisplay=1.7. This set Lowboost=0.7. Highboost was first set at 1/0.7=1.4. For this given experimental condition, a value of highboost of 1.2 was chosen for its balance of enhancing pneumothorax lines while minimally changing the appearance of the lung parenchyma and producing minimal high-frequency noise.

For the sample images, the optimum value of highboost and mask size also depend on the original size of the image and the resolution of film digitizer which produces the digital image from film. Standard size (35×43 cm) chest film were digitized to 4k×5k pixels (117 pixels/cm). A square region 4k×4k was extracted and down sized by pixel averaging to 1k×1k (29 pixels/cm, 0.345 mm/pixel).

Mask sizes ranging from 3 to 99 were tried. Objects smaller than the mask are enhanced in their entirety; objects larger than the mask are edge enhanced and attenuated. When small masks are used, the image is attenuated over a larger frequency range which causes more luminance dynamic range compression. To avoid double line artifacts, the mask should be larger than the size of most common structures appearing in the image, for example, blood vessels.

The mask size which produced the best image was approximately 59 pixels or 2.0 cm in width. This mask size correlates with a study by Prokop et. al. (See: Prokop, Mathias, Schaefer, Cornelia M, Oestmann, Jorg W, Galanski, Michael. Improved Parameters for Unsharp Mask Filtering of Digital Chest Radiographs. Radiology 1993. 97:521–526.) in which a mask size of 2.5 cm was found to be superior to mask sizes of 1.4 mm, 5 mm, and 7 cm.

Smaller masks produced less natural looking images than the larger masks. The smaller masks produced an edge-enhanced image with more "double line" artifacts. This image appeared "flatter", having less depth to the observer, because there was no enhancement until much higher spatial frequencies were reached. Lung markings appeared prominent in all images using a small mask, thus it was difficult to differentiate interstitial lung disease from a normal lung.

The larger masks produced images with a better preserved tone scale. Edges were enhanced to a lesser extent and double line artifacts were minimized. In one image there was a subdiaphragmatic nodule. The nodule was better preserved in the image processed with the larger mask.

As shown in FIG. 10, a modified USM filter (59 pixels) attenuates by using a Lowboost (0.7) until about 0.01 cycles/mm after which Highboost begins to provide restoration of contrast (5% USM gain). Complete restoration and enhancement (maximum gain) occurs at 0.07 cycles/mm. FIG. 10 shows a standard USM filter based on 13 pixels and a gain of 2.0. A smaller mask such as this is typically used in commercially available Computed Radiography.

It will be understood that other image processing techniques well known to those skilled in the art can be used in place of the unsharp masking image processing.

Image Analysis

Processed images have less low-frequency contrast than the original image. The tone scale is altered, but the image is easily recognizable so that the CRT image appearance is not objectionable to the viewer, that is, the CRT image looks similar to a film image. Areas which were very dark in the original image, such as lung fields, are reproduced lighter and have more high-frequency contrast so that more details can be distinguished in the lung parenchyma. Areas which are very light in the originals, such the mediastinum, have more high-frequency contrast and vertebral bodies can be more easily seen. There is a slight edge enhancement which highlights fine lines in the lung fields such as pneumothorax lines. Lung markings are more prominent, but images with interstitial lung disease can be differentiated from normal lung images.

Observers Test Observation of Radiology Images Processed According to the Invention Three attending chest radiologists from the Mallinckrodt Institute of Radiology (MIR), St. Louis, Mo. viewed images processed by the present invention. The viewers had previous experience with printed unsharp masked images from computed radiography (CR) as well as soft-copy displays.

The CRTs used in the initial study were Imlogix model 1000 electronic viewboxes. The screen size was 25 cm×25 cm with a resolution was 1024×1024×12 bits. Monitors were calibrated with a maximum luminance of 160 nits and a minimum luminance of 0.5 nits producing a log dynamic range of 2.5 in a dark room. Monitors were individually linearized with respect to log luminance using LUTs.

Two CRTs were placed side by side in simulated ICU lighting conditions. Overhead lights were on and created a flare light intensity of 3.2 nits reducing the available log dynamic range at the CRTs to 1.7. Images processed by the present invention and unprocessed versions of the same images were displayed side by side on two CRTs. The location of the processed image was alternated to eliminate monitor preference bias in the observers. The original film of the image was placed on a light box above the CRTs. Observers were approximately 1 m from the CRTs and approximately 1.5 m from the light box. The light box was further from the observers to compensate for the size difference of the displays. They were allowed to move to whatever distance was most natural for them.

The image processing technique of the present invention has successfully rendered digitized chest radiographs which are clinically useful on a 1k×1k display under high ambient lighting conditions. Soft-copy display was observed to qualitatively equivalent to film for visualizing image details such as pneumothoraces and accessing tube placement. For some over penetrated films, the soft-copy was superior to the original film. On CRTs, images processed using the method of the present invention appeared equal to or better than unprocessed images in all cases.

It was the opinion of one radiologist that the use of this invention has allowed the satisfactory visualization of pneumothoraces on a 1k×1k display. It was previously believed that a higher resolution display would be necessary for such a task.

The general methods used are not dependent on image type or the display technology. All that is required is that the image data is displayed on a CRT or the like for visualization. Only the values of the parameters need be selected according to the image size and type, the characteristics of the display device, and the ambient lighting conditions present in the viewing area.

With the dynamic range limitations of a soft-copy display operating in high ambient light approaching the dynamic range of high quality reflection prints, it may be possible to print reports for referring physicians that have a paper copy of an image included with the dictated report. Such paper copies are more cost and space efficient than photographic copies.

The invention has been described in detail herein with reference to the figures, however, it will be appreciated that variations and modifications are possible in implementing an equivalent of the disclosed method while staying within the spirit and scope of the present invention.

APPENDIX

```
/****************************************************************************/
/* program us.c                                                             */
/* banded modified unsharp mask                                             */
/*                                                                          */
/* IH = I - IL (blurred image)                                              */
/*                                                                          */
/* output = lowboost * IL + highboost * IH                                  */
/*        = lowboost * IL + highboost * I = highboost * IL                  */
/*        = (lowboost - highboost) * IL + highboost * I                     */
/*        = lowscale * IL + highboost * I                                   */
/*                                                                          */
/* PHO 28 Oct 1 993                                                         */
/* copyright 1993 Paul Ho                                                   */
/* All rights reserved                                                      */
/****************************************************************************/
#include<stdio.h>
#include<stdiib.h>
#include <sys/file.h>
main(argc, argv)
int argc;
char *argv[];
{
    FILE *fdout, *fdin;                    /* output and input file descriptors */
    short lines, pixels;                   /* rows and column sizes of input file */
    short width;                           /* width of the mask */
    short leadwidth;                       /* first half of the mask size */
    short lagwidth;                        /* second half of the mask size */
    long masksize;                         /* number of pixels in the mask */
    short ras;                             /* number of rasters loaded in memory */
    float lowboost, highboost, lowscale;   /* weighting factors */
    long *header;                          /* header copy space */
    short *inimage;                        /* input image space */
    short *outimage;                       /* output image space */
    long vert;                             /* vert accumulator for blurring */
    long acc;                              /* mask accumulator sum of verts */
    short temp;                            /* temp to hold new pixel value */
    short i,j;                             /* counter dummy variables */
```

APPENDIX-continued

```
/* parse command line input */
if(argc!= 6)
  {
  printf("usage: us infile outfile mask lowboost highboost\n");
  printf("mask: positive odd integer\n");
  exit(0);
  }
width = atoi(argv[3]);
if ((width < 0) II ((width % 2) == 0))
  {
  printf("width must a positive odd integer\n");
  exit(0);
  }
ras=width + 1;
masksize = width * width;
leadwidth = width/2;
lagwidth = width - leadwidth;
lowboost = (float)atof(argv[4]);
highboost = (float)atof(argv[5]);
lowscale = lowboost - highboost;
/* open input file */
if((fdin = fopen(argv[1], "r"))== NULL)
  {
  printf("could not open %s\n", argv [1]);
  exit(0);
  }
/* open the output file for writing */
if ((fdout = fopen(argv[2], "w"))== NULL)
  {
  printf("\nError creating output file\n");
  exit(0);
  }
/* copy MIR 8192 byte header */
header = (long*)calloc(2048, sizeof(long));
fread(header, sizeof(long), 2048, fdin);
fwrite(header, sizeof(long), 2048, fdout);
/* read image size */
lines = (short)header[0];
pixels = (short)header[1];
free(header);
/* create temp variable space */
/* space for (mask width + 1) lines of the input image */
/* so that lines can be read only once
inimage = (short *)calloc(pixels * ras, sizeof(short));
/* space for one line of the output image, image written one line at a time */
outimage - (short *)calloc(pixels, sizeof(short));
/* space for (width) number of vertical sum buffers */
vert = (long *)calloc(pixels, sizeof(long));
/* vertical sum buffers each hold a number of pixels equal to (mask height) */
for (i = 0; i < pixels; i++)
   vert[i] = 0;
/* read in (width) rasters and initialize vertical sum buffers */
for(j=0;j < width;j++)
  {
  fread(&inimage[(j % ras) * pixels], sizeof(short), pixels, fdin);
  for (i = 0; i < pixels; i++)
  vert[i] += inimage[(j % ras) * pixels + i];
  }
/* copy first lagwidth lines to output, scaling by lowboost */
for (j = 0; j < lagwidth; j++)
  {
  for (i = 0; i < pixels; i++)
  outimage [i] = lowboost * inimage[(j % ras) * pixels + i];
  fwrite(outimage, sizeof(short), pixels, fdout);
  }
/* main routine for interior of image */
for (j = lagwidth; j < lines - leadwidth; j++)
  {
  /* read new data raster                                           */
  /* can overwrite old raster when no longer needed                 */
  fread(&inimage[((j + leadwidth) % ras) * pixels],
  sizeof(short), pixels, fdin);
  /* update each vertical sum buffer */
  for(i = 0; i < pixels; i++)
  vert[i] = vert[i]
     - inimage[((j - lagwidth) % ras) * pixels.+ i]
     + inimage[((j + leadwidth) % ras) * pixels + i];
  /* sum vertical buffers to get total mask value */
  acc = 0;
```

APPENDIX-continued

```
for(i = 0; i < width; i++)
acc += vert[i];
/* copy first lagwidth pixels to output, scaling by lowboost */
for (i = 0; i < lagwidth; i++)
outimage[i] = lowboost * inimage[(j % ras) * pixels + i];
/* unsharp mask interior of image */
/* out = highboost * in + lowscale * lowpass */
for (i = lagwidth; i < pixels - leadwidth; i++)
{
/* acc updated to reflect new columns */
acc = acc - vert[i - lagwidth] + vert[i + leadwidth];
temp = highboost * inimage[(j % ras) * pixels + i]
    + lowscale * (short)(acc/masksize);
/* bounds checking */
if(temp < 0)temp = 0;
if (temp > 4095) temp = 4095;
outimage[i] = temp;
}
/* copy last lagwidth pixels to output, scaling by lowboost */
for (i = pixels - leadwidth; i < pixels; i++)
outimage[i] = lowboost * inimage[(j % ras) * pixels + i];
fwrite(outimage, sizeof(short), pixels, fdout);
}
/* copy last leadwidth lines, scaling by lowboost */
for (j = lines - leadwidth; j < lines; j++)
{
    for (i = 0; i < pixels; i++)
    outimage[i] = lowboost * inimage[(j % ras) * pixels + i];
    fwrite(outimage, sizeof(short), pixels, fdout);
}
free(vert);
free(outimage);
free(inimage);
fclose(fdin);
fclose(fdout);
}
```

What is claimed is:

1. A method of displaying an image on a display device which has known characteristics and is operated in a controlled fashion, comprising the steps of:

providing a digital image signal of a visual image having a luminance dynamic range DR image for display on an electronic display device having a luminance dynamic range DR display, where DR image is greater than DR display;

determining a low frequency component signal of said digital image signal;

determining a high frequency component signal of said digital image signal;

producing an attenuated low frequency component signal of said digital image from said low frequency component signal by means of a low boost parameter which is a function of DR image and DR display;

producing an amplified high frequency component signal of said digital image signal from said high frequency component signal by means of a high boost parameter which is a function of said low boost parameter; and combining said attenuated low frequency component signal and said amplified high frequency signal to produce a precompensated image signal which has improved luminance dynamic range and spatial frequency characteristics when the image is presented for display on said display device in a high ambient light environment.

2. The method of claim 1, wherein in said determining steps the boundary between the high and low frequency regions is based on the size of anatomical objects of interest and human visual response characteristics.

3. The method of claim 2, wherein the size of said anatomical objects of interest is substantially 2 centimeters in size said digital image signal.

4. The method of claim 3 wherein said step of producing said attenuated low frequency component signal uses a low boost parameter of 0.7, and wherein said step of producing said amplified high frequency component signal uses a high boost parameter of 1.2.

5. The method of claim 1 wherein an step of producing the attenuated low frequency component signal further comprises the step of producing a low frequency component signal by a low boost parameter having a value which is the ratio of DR display/DR image.

6. The method of claim 5 wherein the step of producing an amplified high frequency component signal includes the step of amplifying said high frequency component by a high boost parameter having a value which is a reciprocal of said low boost parameter value.

7. The method of claim 6 wherein said high boost parameter is a function, a) of the display device characteristics including absolute luminance, frequency response, noise; and b) of image information including details and noise, to account for variations in the contrast sensitivity of the human visual system.

8. The method of claim 1 further including the step of calibrating said display device, upon which the precompensated image is displayed, to accept data as a function of luminance.

9. The method of claim 1 further including the steps of measuring the ambient lighting which affects the luminance dynamic range of said display device and of using said measurement in producing said attenuated low frequency component signal.

10. The method of claim 1 wherein said step of determining said low frequency component signal further includes the step of processing said digital image signal with an unsharp mask technique using a uniformly weighted spatial average of a square mask of pixels.

11. The method of claim 10 wherein said square mask of pixels is determined by viewing conditions and HVS, human visual response characteristics.

12. The method of claim 1 wherein the step of determining said high frequency component signal further includes the step of processing said digital image signal with an unsharp mask technique using a uniformly weighted spatial average of a square mask of pixels.

13. The method of claim 12 wherein said square mask of pixels is determined by viewing conditions and HVS, human visual response characteristics.

14. The method of claim 12 wherein the size of said square mask of pixels is substantially 2 centimeters square in said digital image signal.

15. The method of claim 13 wherein the size of said square mask of pixels is substantially 2 centimeters square in said digital image.

16. The method of claim 1 wherein said step of determining the high frequency component signal further includes the step of subtracting said low frequency component signal from said digital image signal.

17. The method of claim 1 wherein said steps of producing an attenuated low frequency component signal uses a low boost parameter and of producing an amplified high frequency component signal uses a high boost parameter, wherein said high boost and low boost parameters have reciprocal values.

18. The method of claim 1 further uses the method of multiresolution representations:

by employing a basis filter function to decompose the image into many frequency bands;

by attenuating low frequency bands;

by amplifying high frequency bands; and by recombining modified spatial frequency bands.

19. A method of displaying an image on a display device which has known characteristics and is operated in a controlled fashion, comprising the steps of:

providing a digital image signal having luminance dynamic range and spatial frequency characteristics which are degraded when visually displayed on the display device;

determining a high frequency component signal of said digital image signal;

producing a scaled high frequency component signal of said digital image signal from said high frequency component signal;

combining said scaled high frequency component signal and said digital image signal; and producing an attenuated signal of said combined digital image by proportionally reducing said combined digital image to produce a precompensated image signal which has improved luminance dynamic range and spatial frequency characteristics when the image is presented for display on a display device.

20. The method of claim 19 further includes the step of processing said digital image signal with an unsharp mask technique using a uniformly weighted spatial average of a square mask of pixels and a scaling parameter that is equal to the difference of the amplification factor of claim one and the attenuation factor of claim one, divided by the attenuation factor of claim one.

21. The method of claim 20 wherein said square mask of pixels is determined by viewing conditions and HVS, human visual response characteristics.

22. The method of claim 20 wherein the size of said square mask of pixels is substantially 2 centimeters square in the digital image signal.

23. The method of claim 19 wherein said step of producing an attenuated signal of said combined digital image comprises multiplication by a proportionally reducing factor.

24. The method of claim 23 wherein said proportionally reducing factor is a function of the luminance dynamic range of the display device and the luminance dynamic range of the original medical image.

25. The method of claim 19 wherein said step of producing a scaled high frequency component signal uses an amplification parameter, which is a function a) of the display device characteristics including absolute luminance, frequency response, noise; and b) image information including details and noise, to account for variations in the contrast sensitivity of the human visual system.

26. The method of claim 19 wherein the step of producing an attenuated signal of said combined digital image by proportionally reducing said combined digital image is implemented in a look-up-table for improved performance.

* * * * *